United States Patent [19]

Thevenon et al.

[11] Patent Number: 5,002,393
[45] Date of Patent: Mar. 26, 1991

[54] LOW NOISE OPTICAL SYSTEM

[75] Inventors: Alain Thevenon, Bretigny/Orge; Michel Le Clercq, Bois-Le-Roi, both of France

[73] Assignee: Instruments S.A., France

[21] Appl. No.: 358,858

[22] Filed: May 30, 1989

[30] Foreign Application Priority Data

Sep. 12, 1988 [EP] European Pat. Off. .......... 88402297.1

[51] Int. Cl.$^5$ .............................................. G01J 3/18
[52] U.S. Cl. .................................................... 356/333
[58] Field of Search ................ 356/328, 334, 324, 333

[56] References Cited

U.S. PATENT DOCUMENTS 4,575,243  3/1986  Witte ..................................... 356/333
4,696,570  9/1987  Joliot et al. ...................... 356/334 X

FOREIGN PATENT DOCUMENTS 56-119822  9/1981  Japan .................................. 356/328

Primary Examiner—Vincent P. McGraw
Attorney, Agent, or Firm—Handal & Morofsky

[57] ABSTRACT

A double spectrograph system is disclosed. An entrance slit receives and passes light to be analyzed. A first focusing diffraction grating receives that light. A second focusing diffraction grating receives light reflected by the first focusing diffraction grating. The first and second focusing diffraction gratings both have the characteristic of forming planar substantially anastigmatic spectra. Mounting means keeps the first and second gratings at positions symmetrical about an imaginary plane and with their respective focal planes substantially coincident with each other and the imaginary plane. An exit slit receives the light after it has been reflected by the first grating to the second grating and from the second grating to the exit slit.

10 Claims, 3 Drawing Sheets

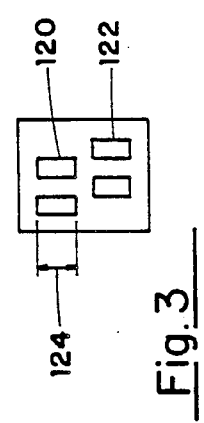
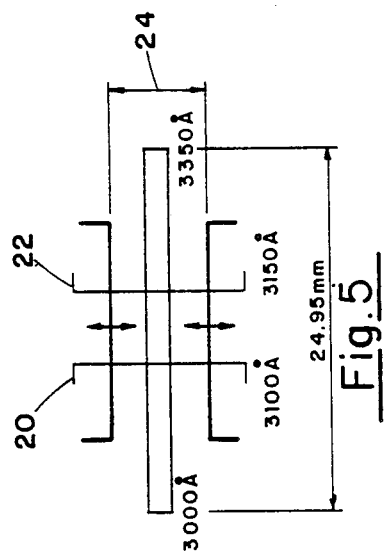
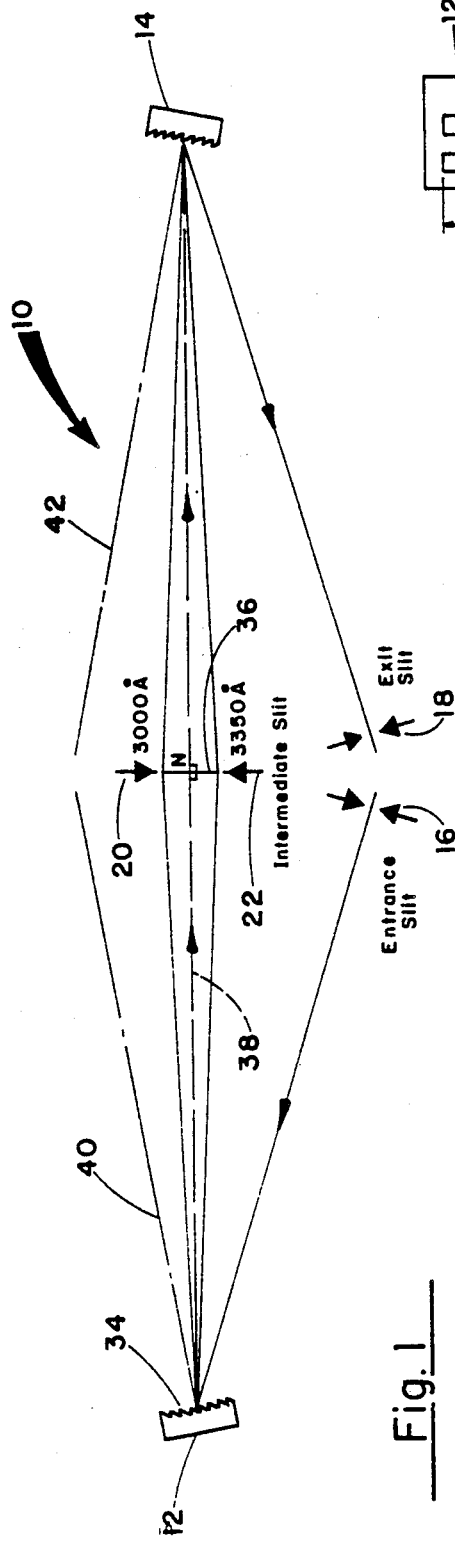
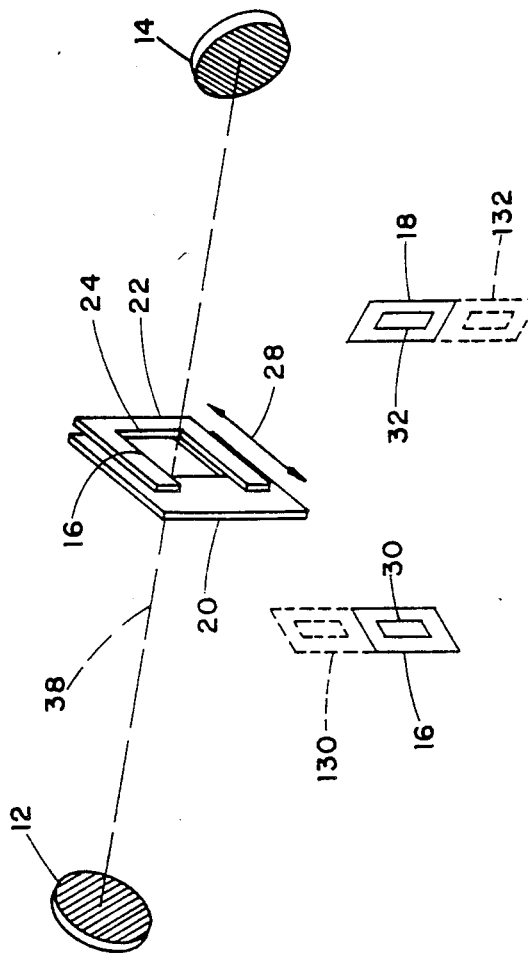

LOW NOISE OPTICAL SYSTEM

TECHNICAL FIELD

The present invention relates to an optical bandpass system comprising a pair of gratings arranged in a subtractive, zero dispersion arrangement.

BACKGROUND

Classically, the analysis of spectra is performed by allowing a source to emit radiation through a slit whose luminous output is first collimated, caused to fall on a usually planar diffraction grating and then focused for viewing through an image slit. Typically, in high resolution applications, the image slit position is varied in order to measure the intensity of light at various positions in the spectra, which positions correspond to various wavelengths of light in the particular emission spectra being analyzed. Typically such analysis can be done through the use of photocells which provide not only an indication of the existence of light at a particular wavelength, but also an indication of the magnitude of light at that wavelength.

A major advance in the development of high quality low aberration systems for the analysis of spectral emissions was introduced in the late 1960's by the assignee of the present application. In particular, Flammand has described in his patent the use of holographic recording techniques for the manufacture of a diffraction grating, wherein the hologram is recorded on a concave surface, presented the possibility of high quality aberration-corrected focusing gratings.

Still a more interesting possibility is discussed in later patents of the assignee herein in which a grating is disclosed in which a substantially planar spectrum is produced by a single concave spherical grating surface while minimizing to any possible degree the various aberrations such as coma, astigmatism, and so forth. As can be seen in accordance with the teachings of this patent, the calculation of the various aberrations in a grating may be made depending upon recording and use parameters.

While the essence of the above-referenced patent to Flammand was the recognition of an intuitive approach to a solution of the problem of providing an aberration corrected grating, later quantitative approaches when coupled with intuitively produced models, provided the possibility of whole families of solutions with excellent characteristics.

With the introduction of increasingly fast, and powerful computers over the last fifteen years, grating designs have been increasingly based on more of a brute force approach involving the postulation of recording configurations and the measurement of their characteristics of use and the evaluation of variations of gratings of known characteristics in order to develop gratings having similar characteristics but being somewhat tailored to particular or potential uses. Such work is done by computer modeling techniques based on models. Thus, the possibility exists today of manufacturing, through the use of holography, gratings having a wide range of characteristics, such as low coma, low astigmatism, or low spherical aberrations.

However, as a practical matter single element focusing and dispersing systems, while of very high quality, do have limitations. In particular, stray and randomly scattered radiation becomes particularly troublesome when one wishes to discriminate extremely weak emissions which are in the presence of somewhat stronger emissions For example, if one wishes to detect the presence of lead in materials containing calcium, the extreme brightness of the calcium lines will tend to create noise in the detection of the lead spectral emissions. A similar situation occurs if one wishes to detect the presence of arsenic where there are strong calcium emissions.

While the causes are not the same, virtually the same problem is encountered in the case of laser induced emissions where the sample is excited by a laser beam having a very powerful luminous output. Such techniques are used for example, in both Raman spectroscopy and fluorescence measurements. One possible solution to this problem is the use of the so-called double monochromator. The principles behind such devices are discussed for example, in an article written by M. V. R. K. Murty in Applied Optics, volume 11, no. 1, July 1972.

Generally a double monochromator comprises a first slit acting as a source including light of a particular wavelength which is the signal which one wishes to extract in addition to emissions at numerous other wavelengths which may be considered as potentially contributing to noise. This slit is arranged to cause light including the "signal" to be detected to fall upon a collimating mirror which reflects the light onto a planar diffraction grating which, in turn, diffracts the light into a second focusing reflective member. The output of the focusing reflective member is then passed through another slit which acts as a spatial filter or mask selecting out the desired wavelengths plus a certain quantum of the noise at a wavelength outside the desired range of wavelengths. This light is then passed on to a second collimating reflector which in turn causes light to fall upon a second planar diffraction grating. The light is then reflected onto a second focusing mirror which passes light to an output slit. Thus, in principle, the output of the double monochromator has a much higher signal to background ratio than the input to the double monochromator. Nevertheless, the double monochrometer comprises quite a few rather inexpensive components.

SUMMARY OF THE INVENTION

The invention is intended to provide a remedy. It solves the problem of how to provide a device in which the evaluation of light intensity for spectral emissions at a plurality of wavelengths may be achieved simultaneously and without the rotation of gratings. Moreover, the above can be achieved for a plurality of emissions simultaneously using a single dispersive system. The same is achieved through the use of a compensated coma zero dispersion double spectrometer arrangement. More particularly, the invention contemplates the use of a pair of concave gratings calculated for the most perfectively achievable correction of astigmatism throughout the spectral range of interest for a planar spectral focal plane, while minimizing the aberrations of defocalization, coma and spherical aberration to the lowest achievable values given the primary design consideration of as perfectly anastigmatic images as possible in a single focal plane. At and close to the central wavelength, coma is somewhat less critical than defocalization and spherical aberration in view of the fact that a double arrangement of gratings is selected which results in the comas of the two gratings cancelling each other due to the subtractive nature of the arrangement.

In accordance with the present invention, a double spectrograph system comprises an entrance slit which receives and passes light to be analyzed. A first focusing diffraction grating receives that light. A second focusing diffraction grating receives light reflected by the first focusing diffraction grating. The first and second focusing diffraction gratings both have the characteristic of forming planar substantially anastigmatic spectra. Mounting means keeps the first and second gratings at positions symmetrical about an imaginary plane and with their respective focal planes substantially coincident with each other and the imaginary plane. An exit slit receives the light after it has been reflected by the first grating to the second grating and from the second grating to the exit slit.

BRIEF DESCRIPTION OF THE DRAWINGS

One way of carrying out the invention is described in detail below with reference to drawings which illustrate only one specific embodiment of the invention and in which:

FIG. 1 is a diagram of the inventive double spectrograph;

FIG. 2 is a perspective view of the system of FIG. 1;

FIG. 3 is an alternative spectral filter used in the inventive system;

FIG. 5 is a detail of the jaws of a spatial filter used with the invention;

BEST MODE FOR CARRYING OUT THE INVENTION

Figure 6:
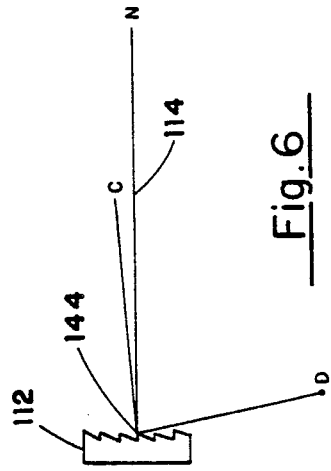
FIG. 6 illustrates manufacture of the grating of FIG. 4.

Referring to FIG. 1, the structure of a double spectrograph system 10 constructed in accordance with the present invention is illustrated. System 10 includes a first concave diffraction grating 12 and a second concave diffraction grating 14. Light for analysis is provided to the system by entrance slit 16. The output of the system is taken at exit slit 18. Bandpass selection within system 10 is provided by a pair of jaws 20 and 22 which together act to pass only a portion of the spectrum formed by grating 12.

The operation of the jaws may be more easily seen from FIG. 2, which is a diagrammatic perspective view of the system. More particularly, as can be seen from FIG. 2, jaws 20 and 22 may generally comprise U-shaped sheet metal members which are painted black and in the manner of conventional structures define a bandpass slit having a height 24 and a variable width 26 which may be varied by movement of the jaws 20 and 22 in the direction defined by arrow 28. If one wishes to vary the height 24, four jaws 20, 22, 21 and 23 as shown in FIG. 5 may be used. Likewise, entrance slit 16 and exit slit 18 are of conventional design each incorporating a slit window 30 and 32, respectively. While in accordance with the present invention the heights of windows 30 and 32 and the band pass window defined between jaw 20 and 22 are extremely small, the same are shown in an exaggerated size for purpose of illustration only. Actual values depend on wavelength and the particular grating used. In the use of the grating of Example 1, below, the values for height 24 take the values given in Table I, below. In accordance with the present invention, grating 12 is a concave holographically manufactured diffraction grating having a concave surface 34 on which a plurality of grooves are disposed.

In accordance with the present invention, grating 12 is selected for perfect correction of astigmatism in a planar spectrum which it creates along an imaginary plane 36. In particular the correction of astigmatism should be as perfect as is achievable over the entire useful spectral range over which one wishes to operate the instrument. Other aberrations, including defocalization, comas, and spherical aberrations are reduced to the lowest possible values over the selected usable spectral range of the grating.

In accordance with the preferred embodiment, it is seen that if one were to pass an imaginary line 38 perpendicular to line 36, this line substantially coincides with the summit of the grating and the middle of the spectral range for which the instrument is designed. Naturally, such a condition is not necessary but represents a preferred mode of operation. The normal to the summit of the grating is represented by line 40. Likewise, in accordance with the preferred mode, gratings 12 and 14 as well as entrance and exit slits 16 and 18, respectively, are at fixed positions during use and are not varied. In contrast, jaws 20 and 22 are mounted for adjustable positioning and adjustable spatial selection of a particular part of a spectrum desired.

As can be seen most clearly from FIG. 1, grating 14 is positioned in a mirror-image position corresponding to that of grating 12 with symmetry about line 36. As a consequence of the particular arrangement shown in FIG. 1, and the mirror image placement referred to above, coma in grating 12 is subtracted from the coma in grating 14.

Generally, in multiple grating arrangements in which two identical gratings are used, it is possible to determine whether the two gratings in tandem cancel out each other's coma by considering that the off-axis mounting of the focusing gratings is in the case of both the gratings of equal angular magnitude. Thus, at the common theoretical focal point of the two gratings an image could be considered to be formed by each of the gratings, depending upon which slit is the entrance and which is the exit. If we consider, for example, slit 16 acting as an entrance, coma created at the focal plane defined by line 36 would have a certain sense. Likewise, if exit slit 18 were to be considered an entrance slit, the coma that it produces at an imaginary focal image in the plane defined by line 36 would have the same sense. Thus, it can be seen that the comas will subtract from each other and cancel each other out with the arrangement illustrated in FIG. 1.

A similar analysis can be seen in the case of determining the dispersion of the system illustrated in FIG. 1. Here the gratings 12 and 14 are identical and exhibit dispersions in the same magnitude and with the same sense. Thus, it can be seen that the net dispersion of the system illustrated in FIG. 1 is zero.

In accordance with the present invention, the use of identical gratings 12 and 14 which have the characteristics of forming a planar spectrum in a common plane containing line 36, which characteristics are substantially perfectly corrected for astigmatism with minimum values of other aberrations, as noted above, results in the possibility of being able to select a given range of wavelengths in the spectrum within the usable spectral range of the grating, while recombining the selected spectrum into a signal having a much higher signal to noise ratio. In particular, if we consider entrance slit 16 to be a point source, the light input passing through slit 16 is broken down into its components by grating 12. A selected part of the spectrum is passed between jaws 20 and 22, and this part is recombined into an output passed by exit slit 18 from grating 14.

In principle, it can be seen that, if there are very strong signals outside the range of interest, certain stray and scattered light components will pass between jaws 20 and 22. However, the net amount of those stray, scattered and other undesirable light components contained in the output of exit slit 18 will be far less than those entering entrance slit 16. Thus, it can be seen that the signal to background ratio of the output of exit slit 18 is greatly improved over the input signal. Moreover, in accordance with the present invention, it is possible in a high resolution low aberration system to select any band range between the upper and lower wavelength limits of the system for analysis.

Moreover, because the images produced at line 36 are substantially anastigmatic, a very narrow slit height 24 may be employed and this results in increased signal to noise ratio over conventional systems.

Yet further advantages are achieved when it is seen that the stigmatic nature of the system will allow the use of fiber optic inputs and outputs and the possibility of stacking a plurality of inputs over each other as illustrated in phantom lines in FIG. 2. Additional slits 30 and 32 thus form a completely independent use of the same instrument. It is noted that in this condition it is also possible to consider a multiple layer pair of bandpass jaws 20, 22, as illustrated in FIG. 3 which are selected to be independent of each other, although they must, of necessity, both be limited to the selection of wavelengths within the usable spectral range of gratings 12 and 14.

EXAMPLE 1

Figure 4:
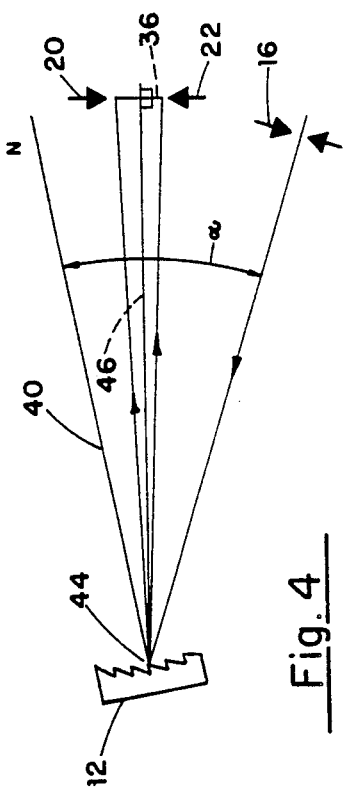
FIG. 4 illustrates the characteristics of a grating useful in the present invention.

An instrument having the configuration illustrated in FIG. 1 is constructed using the grating having the characteristics illustrated in FIG. 4. In particular, the grating illustrated in FIG. 4 has a blank diameter of 70 mm and is intended to have an effective useful area of 66 mm. The radius of curvature of the blank is 350 mm and the groove density of the grating is 2000 grooves per millimeter If we consider a normal 40 to the grating surface and passing through the summit 44 of the grating, the operating characteristics of the grating may be specified.

In particular, at an angle $\alpha$ of $-26.69°$ with respect to normal 40, one may put an input slit 16 at a distance of 351.297 mm from summit 44 on the grating. In accordance with customary terminology, this distance of 351.297 mm would be referred to as $L_a$. The characteristics of grating 112 are such that a mid-range wavelength passing along imaginary line 46, where line 46 is with respect to normal 40 at an angle $\beta_H$ equal to $-10.717°$. With respect to normal 40 a planar spectrum having the desired anastigmatism and minimal aberrations with respect to spherical aberrations and so forth, is formed in the plane defined by line 36 which is perpendicular to line 46. The usable spectral range of the grating 44 illustrated in FIG. 4 is between 3000 and 3350 Angstroms. In particular, light having a wavelength of 3350 Angstroms is deflected at an angle $\beta_{3350}$ equal to $-12.758°$ with respect to normal 40, while light having a wavelength of 3000 Å is deflected at an angle $\beta_{3000}$ equal to $-8.676°$. Finally, given the characteristics of grating 44, the planar spectrum formed along line 36 is positioned at a distance $L_h$ equal to 350.037 mm which represents the distance between the center point of a spectrum extending between jaws 20 and 22 and lying along line 36 and the center point 44 of the grating at the other end.

The width of the spectrum produced between 3000 Å and 3550 Å in such a system is 24.95 mm and it is possible to position jaws 20 and 22 to selectively choose any part of the desired spectrum, for example, the range between 3100 Å and 3150 Å, as illustrated in FIG. 5. Image height varies as a function of wavelength and has been found to have the values given in Table I.

TABLE I

| Wavelength (A°) | TOTAL IMAGE HEIGHT (mm) |
|---|---|
| 3000 | 0.010 |
| 3100 | 0.009 |
| 3200 | 0.008 |
| 3300 | 0.007 |
| 3450 | 0.006 |

The grating illustrated in FIG. 4 may be manufactured using light sources positioned as in the diagram of FIG. 6. In particular, we can consider recording the grating on a sensitive concave holographic blank 112 having a diameter of 70 mm and a radius of curvature of 350 mm. A normal to the summit of blank 112 is indicated by imaginary line 114. Point sources having a wavelength of 5145 Angstroms are positioned at points C and D in FIG. 6. Point C is located at an angle of $+2.95°$ with respect to normal 114 and is positioned at a distance of 351.349 mm from summit 144 of blank 112, and in the plane defined by normal 114 and the first source. The second point source at point D is positioned at an angle of $-77.832°$ with respect to normal 114 and at a distance of 868.475 mm from summit 144 of blank 112. Activation of the sources having outputs at 5145 Angstroms and positioned at points C and D and exposing the sensitive surface of blank 112 results in recording a grating having the characteristics illustrated in FIG. 4.

As noted above, the grating manufactured in accordance with the recording diagram illustrated in FIG. 6 and having the characteristics illustrated in connection with FIG. 4 when placed inside the system of FIG. 1 results in a device having the ability to act as a bandpass filter for any range of wavelengths within the overall range of 3000 to 3350 Angstroms. Moreover, such selection is made without movement of the gratings or the entrance or exit slits. Rather only jaws 20 and 22 need to be moved in order to provide a desired bandpass range.

EXAMPLE 2

Figure 7:
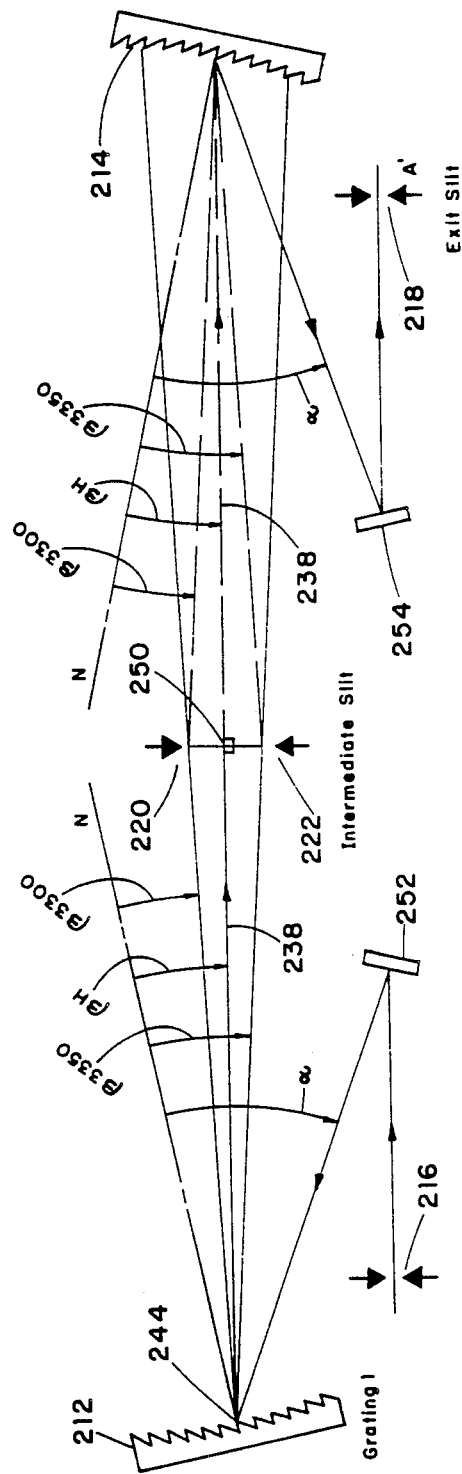
FIG. 7 is an alternative embodiment of the invention.

An alternative approach using a pair of gratings 212 and 214 which are also both identical to the grating illustrated in FIG. 4 is shown in FIG. 7. Generally, corresponding parts herein are given numbers which differ by a multiple of 100. Here the configuration of the gratings is identical with their imaginary mid-range ray paths 238 corresponding to imaginary line 38 in FIG. 1 and extending between the center 250 of the usable spectral range and the center of the grating 244 lying along a single line. The only change is that the input paths from the entrance slit and the output paths from the exit slit are each folded, respectively, by mirrors 252 and 254. Nevertheless, path lengths remain the same and the arrangement is provided only to provide more convenient operation of the system.

The operation of the double spectrograph illustrated in FIG. 7 is as follows. Light is emitted from entrance slit 216 and is reflected by planar mirror 252 onto the surface of grating 212 which causes the light to be broken up into a spectrum and reflected between jaws 220 and 222. This light, in turn, is recombined by grating 214 into a homogeneous mixture having signal to noise ratio far superior to the light input into slit 216. This homogeneous output is then reflected by planar mirror 254 to exit slit 218.

EXAMPLE 3

Figure 8:
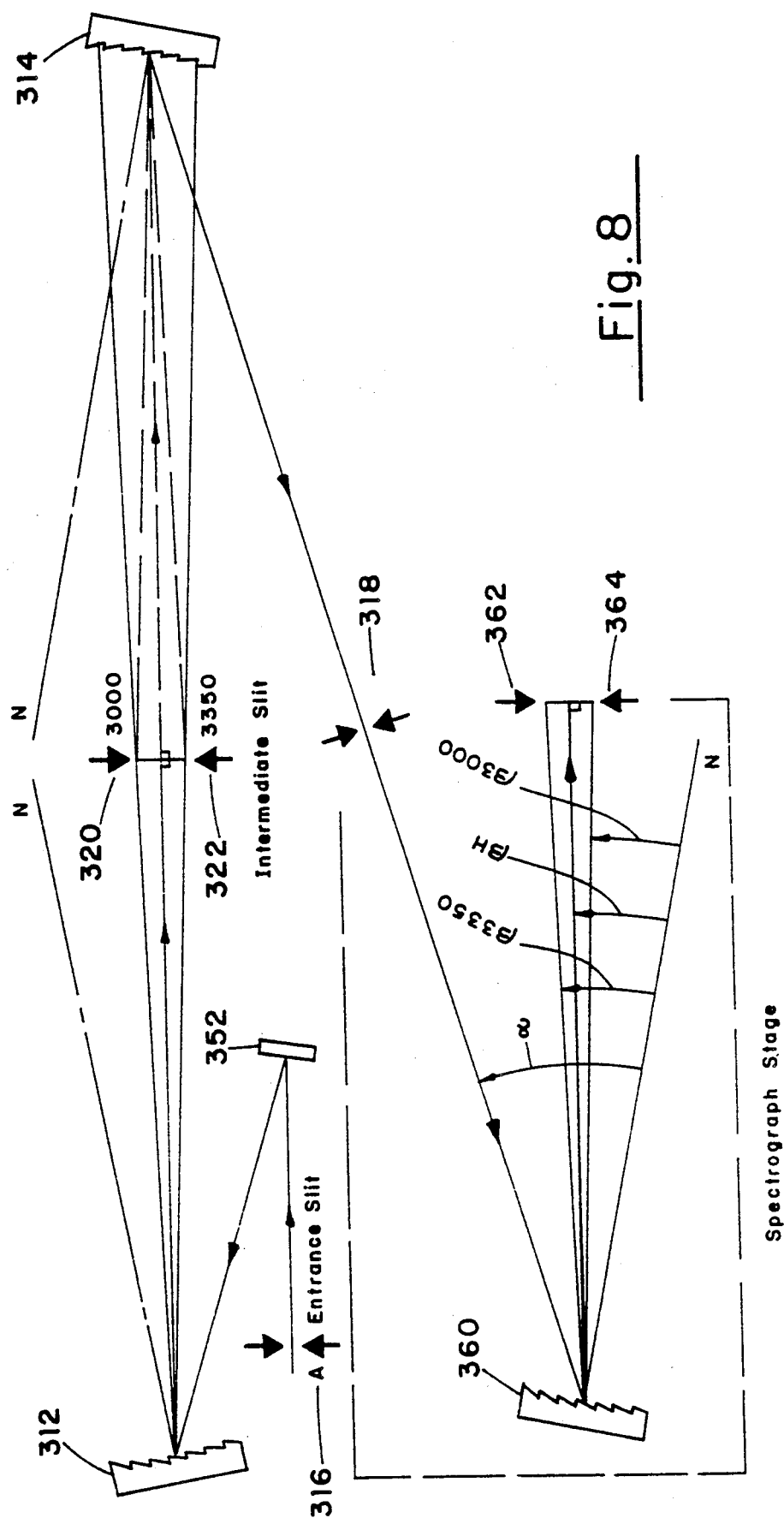
FIG. 8 is yet another alternative embodiment.

Still another possibility is illustrated in FIG. 8. Here again all gratings have the characteristics of the grating illustrated in FIG. 4. The entrance arrangement to this system is identical to the entrance illustrated in FIG. 7 and the arrangement of the remaining parts of the system is identical to the arrangement illustrated in FIG. 1. Here, however, an additional grating 360 is provided for receiving the output of exit slit 318 which acts as an entrance slit for a spectrograph stage comprising grating 360 and a spectrograph output between jaws 362 and 364.

It is noted that the output of jaws 362 and 364 is usable in the range of 3350 Å and represents a significant increase in signal-to-noise ratio as compared to the output of the single spectrograph stage represented, for example, by the output of input grating 312.

The operation of the device illustrated in FIG. 8 is as follows. Light entering entrance slit 316 is reflected by planar mirror 352 which causes it, in turn, to fall upon the concave face of grating 312, which reflects the light broken into a spectrum to jaws 320 and 322, which allow the selected spectrum to fall upon grating 314, which is, in turn, reflected out toward exit slit 318. The output of slit 318 is passed onto grating 360 which provides a planar spectrum between jaws 362 and 364.

While an illustrative embodiment of the invention has been described above, it is, of course, understood that various modifications will be apparent to those of ordinary skill in the art. Such modifications are within the spirit and scope of the invention, which is limited and defined only by the appended claims.

What is claimed is:

1. A double spectrograph system, comprising:
   (a) entrance means for receiving and passing light to be analyzed;
   (b) a first focusing diffraction grating for receiving said light to be analyzed passed by said entrance means;
   (c) a second focusing diffraction grating for receiving light reflected by said first focusing diffraction grating, having the characteristic of forming planar substantially anastigmatic spectra, said planar spectrum formed by said first focusing diffraction grating having substantial anastigmatism within a predefined usable range of wavelengths, said wavelengths being provided along a planar substantially linear locus and wherein defocalization and spherical aberrations are at minimum achievable values;
   (d) mounting means for positioning said first and second gratings at positions on opposite sides of an imaginary plane and with their respective focal planes substantially coincident with each other and said imaginary plane; and
   (e) exit means for receiving said light after it has been reflected by said first grating to said second grating and from said second grating toward said exit means.

2. A system as in claim 1, wherein, said gratings are arranged for compensation of coma.

3. A system as in claim 2, wherein, said gratings are identical.

4. An optical arrangement as in claim 1, wherein, movable masking means are provided along said imaginary plane to select out a given range of wavelengths.

5. A system as in claim 1, comprising a spectrograph receiving the output of said exit means.

6. An optical system as in claim 5, wherein, said entrance and exit means are fiber optic members.

7. An optical arrangement as in claim 1, wherein said first and second focusing diffraction gratings are identical.

8. A double spectrograph system, comprising:
   (a) entrance means for receiving and passing light to be analyzed;
   (b) a first focusing diffraction grating for receiving said light to be analyzed passed by said entrance means;
   (c) a second focusing diffraction grating for receiving light reflected by said first focusing diffraction grating, said first and second focusing diffraction gratings both having the characteristic of forming planar substantially anastigmatic spectra;
   (d) mounting means for positioning said first and second gratings at positions symmetrical about an imaginary plane and with their respective focal planes substantially coincident with each other and said imaginary plane;
   (e) exit means for receiving said light after it has been reflected by said first grating to said second grating and from said second grating toward said exit means; and
   (f) movable masking means positioned along said imaginary plane to select out a given range of wavelengths, said movable means is a window of adjustable width, adjustable height, and adjustable position, said window being positionable within said plane to pass a part of a spectrum focused in said plane.

9. An optical system as in claim 8, further comprising second sets of entrance and exit means and second sets of masking means said second sets being disposed at positions vertically displaced from said first sets in a direction away from the plane defined by said entrance and exit means and said first and second gratings.

10. A double spectrograph system comprising:
    (a) entrance means for receiving and passing light to be analyzed;
    (b) a first focusing diffraction grating for receiving said light to be analyzed passed by said entrance means;
    (c) a second focusing diffraction grating for receiving light reflected by said first focusing diffraction gratings, said first and second focusing diffraction gratings both having the characteristic of forming planar substantially anastigmatic spectra;
    (d) mounting means for positioning said first and second gratings at positions on opposite sides of an imaginary plane, and oriented and positioned with respect to said entrance means to cause light input by said entrance means to be focused in said imaginary plane, said first and second focusing diffraction gratings being positioned with their respective focal planes substantially coincident with each other and said imaginary plane; and (e) exit means positioned symmetrically with respect to said entrance means about said imaginary plane for receiving said light after it has been reflected by said first grating to said second grating and from said second grating toward said exit means.

* * * * *